United States Patent [19]

Thompson

[11] 4,165,346

[45] Aug. 21, 1979

[54] COPOLYMER OF POLY(4,7-DIOXADECAMETHYLENE ADIPAMIDE)-POLYCAPROLACTAM CONTAINING TEREPHTHALIC ACID

[75] Inventor: Robert M. Thompson, Wilmington, Del.

[73] Assignee: Sun Oil Company of Pennsylvania, Philadelphia, Pa.

[21] Appl. No.: 945,363

[22] Filed: Sep. 25, 1978

Related U.S. Application Data

[63] Continuation-in-part of Ser. No. 745,318, Nov. 26, 1976, abandoned.

[51] Int. Cl.$^2$ ............................................. C08L 77/00
[52] U.S. Cl. .................................. 525/432; 260/78 R; 260/78 A
[58] Field of Search ..................... 260/857 TW, 78 R

[56] References Cited

U.S. PATENT DOCUMENTS

| | | | |
|---|---|---|---|
| 2,577,621 | 12/1951 | May | 260/78 R |
| 3,397,107 | 8/1968 | Kimura | 161/173 |
| 3,499,853 | 3/1970 | Griebsch | 260/13 |
| 3,509,106 | 4/1970 | Lotz | 260/78 R |
| 3,549,724 | 12/1970 | Okazaki | 260/857 |
| 3,683,047 | 8/1972 | Honda | 260/857 TW |
| 3,729,449 | 4/1973 | Kimura | 260/78 R |
| 3,843,609 | 10/1974 | Kimura | 260/78 R |
| 3,882,090 | 5/1975 | Fagerburg | 260/78 R |
| 4,044,071 | 8/1977 | Nickol | 260/857 TW |
| 4,045,511 | 8/1977 | Nickol | 260/857 TW |
| 4,045,512 | 8/1977 | Thompson et al. | 260/857 TW |
| 4,113,794 | 9/1978 | Thompson et al. | 260/857 TW |

FOREIGN PATENT DOCUMENTS

| | | | |
|---|---|---|---|
| 2454118 | 5/1975 | Fed. Rep. of Germany | 260/857 TW |
| 2454119 | 5/1975 | Fed. Rep. of Germany | 260/857 TW |
| 2454142 | 5/1975 | Fed. Rep. of Germany | 260/857 TW |

OTHER PUBLICATIONS

T. M. Frunze et al: "On Heterochain Polyamides XVIII Formation of Mixed Polyamides During Melting of The Homochain Compounds," High Molecular Weight Compounds (U.S.S.R.) 1, 500–505 (1959), No. 4, Apr.

*Primary Examiner*—Paul Lieberman
*Attorney, Agent, or Firm*—J. Edward Hess; Donald R. Johnson; Anthony Potts, Jr.

[57] ABSTRACT

Fibers of block copolymer of poly (4,7-dioxadecamethylene adipamide) - polycaprolactam, i.e. N-30203-6//6, have a tendency to fuse when scoured in boiling water. By replacing a minor amount of the adipic acid present in the N-30203-6 portion of the block copolymer with terephthalic acid the fusion is eliminated. The resulting novel composition consists of blocks of random N-30203-6 and N-30203-T with nylon-6 blocks. The composition maintains its good hydrophilic properties.

2 Claims, No Drawings

COPOLYMER OF POLY(4,7-DIOXADECAMETHYLENE ADIPAMIDE)-POLYCAPROLACTAM CONTAINING TEREPHTHALIC ACID

CROSS REFERENCE TO RELATED APPLICATION

This application is a continuation-in-part of application Ser. No. 745,318 filed Nov. 26, 1976 now abandoned.

BACKGROUND OF THE INVENTION

1. Field of the Invention

This invention is directed to a novel composition of matter. The composition is a particular nylon copolymer having utility as a fiber.

2. Description of the Prior Art

The poly (4,7-dioxadecamethylene adipamide)-polycaprolactam block copolymer, referred to hereinafter as N-30203-6//6, is disclosed in my pending U.S. application Ser. No. 557,717, filed Mar. 25, 1975. Method for making such a polymer is also disclosed therein. The block copolymer N-30203-6//6 has utility as a hydrophilic fiber. While it also has other favorable properties such as tenacity, elongation and initial modulus, it can have a fusion problem as described hereinafter.

To form a fabric from the block copolymer N-30203-6//6, the copolymer is spun into a fiber by known means. While spinning the fiber, a lubricating finish is applied to the fiber to facilitate subsequent processing steps. After the copolymer is spun, it is drawn and then annealed to stabilize the drawing. The resulting fiber is knitted into a tube and then, to wash off the finish applied earlier, it is placed in boiling water. During this washing off in the boiling water, the copolymer fibers have a tendency to fuse together. (The washing off in boiling water is referred to as scouring). This fusion causes the knitted fabric to become stiff which is unacceptable to a wearer.

SUMMARY

It has been discovered that if a small portion of the adipic acid in the N-30203-6 portion of the block copolymer N-30203-6//6 is replaced with terephthalic acid (hereinafter referred to as T), the aforementioned fusion problem is eliminated. Surprisingly the resulting copolymer maintains the desirable hydrophilic, tenacity, elongation and initial modulus properties of N-30203-6//6.

DESCRIPTION

The copolymer of my discovery has the following structural formula:

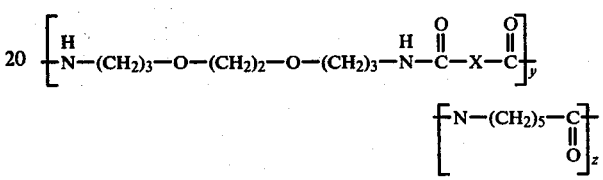

wherein
X consists essentially of the bivalent radical —$(CH_2)_4$— and the bivalent paraphenylene radical, the latter being present in minor amount sufficient to eliminate fiber fusion when the copolymer is scoured in boiling water, but not greater than about 13 weight percent of the total bivalent radical X and
y = 4–200
z = 4–200
and the copolymer has a molecular weight of within the range of about 5,000–100,000.

The ether-amide portion of the copolymer can be prepared by the following scheme:

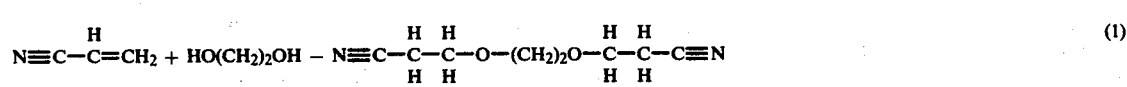

(1)

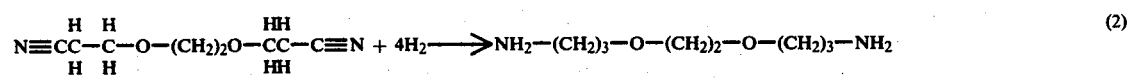

(2)

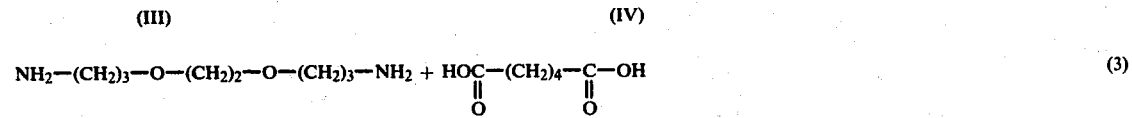

(3)

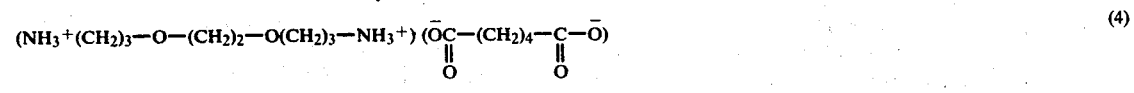

(4)

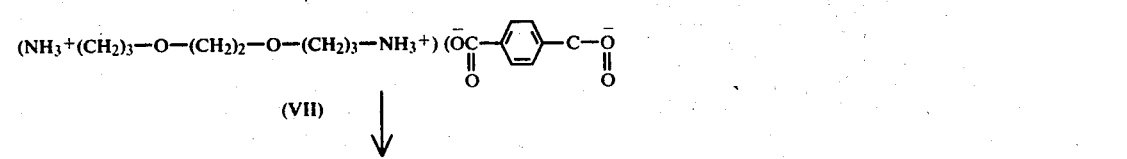

-continued

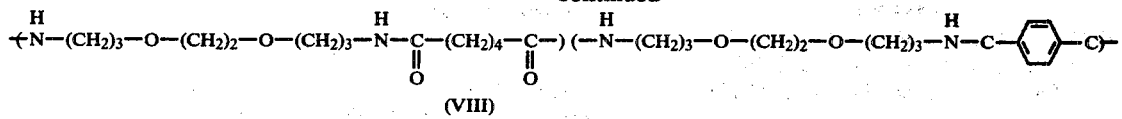

(VIII)

Aforementioned reaction (1) is often referred to as cyanoethylation; it is between acrylonitrile, I, and ethylene glycol, II, and results in 1,2-bis (β-cyanoethoxyethane), III. Reaction (2) is the hydrogenation of compound III to the diamine (i.e., 4,7-dioxadecamethylenediamine), IV. The diamine, IV, is reacted with adipic acid, V, to form the salt, VI, in reaction (3). To prepare the analogous terephthalic salt, the aforementioned reactions (1)–(3) can be duplicated except that in reaction (3) in place of adipic acid, terephthalic acid is used. Then the two salts, i.e. VI and VII, are polymerized by heating to form the random copolymer, VIII. The latter contains N-30203-6 and N-30203-T. Thus the random copolymer can be represented as N-30203-6/T.

The amount of adipic acid used to prepare the aforementioned salt VI is usually such that it constitutes not less than about 87 weight % of the total diacid that could be used to react with the diamine IV. The balance of the acid used is T and usually amounts to not more than about 13 weight %. If much more than about 13 weight % of T is used, then some properties of the copolymer may deteriorate too much.

Sufficient T is used to eliminate the fiber fusion which occurs if no T is present. The amount of T required to eliminate fiber fusion varies from one copolymer to another within the invention. Typically, the amount used will be at least about three weight percent, though lesser amounts, such as about one or two percent or less are sufficient in some cases.

The other portion of the copolymer of present invention is

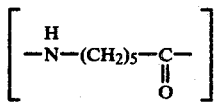

which is also known as a bivalent radical of nylon-6 or N-6. The latter is available commercially and methods for preparing it are well known and abundantly disclosed in numerous publications.

As indicated, the aforementioned portions of N-30203-6/T and N-6 each can contain as few as 4 repeating units within the copolymer of present invention. Thus, both x and y can equal 4. As reported in my previously referred to application, 4 represents the lowest value that the components can be present and still retain its own particular properties without substantially degrading the properties of the other repeating units. To minimize loss of properties, the preferred minimum values for y and z are 8 and more preferred values are 10. While values of z of 200 are operative, preferred maximum values of y and z are 175 and 185 with values of 150 and 160 more preferred.

The process used to prepare the copolymer involves a process known as melt blending. In melt blending two different polyamides are mixed together and heated to a temperature which ranges from above both their melting points to below both their decomposition temperatures. The length of time the mixture is maintained within the temperature range has a profound effect on the resulting structure. As the mixing with the aforementioned temperature range begins the mass is a physical mixture of two different compounds. But gradually as the heating and mixing continues, the mixture is converted into a copolymer characterized as a "block" copolymer. However, if the heating and mixing continues, the length of the "blocks" decrease and sequences of "random" copolymers appear. If the heating and mixing occurs for a sufficient time, most of the "blocks" disappear and mostly "random" sequences form as evidenced by deterioration of its physical properties, including melting point. Use of a higher temperature within the aforementioned range reduces the time necessary to achieve the desired amount of block formation at a lower temperature. At present there is no known direct way of determining chain sequence of such a polymer. But indirect methods exist, and these are known to those skilled in the art. Controlled decomposition of such a copolymer will yield all identifiable components that make up the copolymer but will not indicate sequences.

Melt Blending can be used to prepare N-30203-6/T//6. Desired amounts of N-30203-6/T are blended with suitable amounts of N-6. The resulting mixture is heated to a temperature which ranges from above the melting point of each to below the decomposition temperature of each. While within the temperature range, the mixture is mixed until the desired amount of blocks are formed. The time for mixing at the elevated temperature depends upon how much material is present, the amount of mixing occurring, the type of equipment used, and the like.

The copolymer of the invention can also contain an antioxidant, delusterant, light stabilizer, and other such additives. The additives can be incorporated, e.g., prior to the melt blending or during the melt blending or afterwards.

The following examples illustrate further my invention.

EXAMPLES

A random N-30203-6/T, containing by weight 80% of N-30203-6 and 20% of N-30203T, was prepared in the following manner. Eight grams of N-30203-T salt were mixed with 32 grams of N-30203-6 salt. Both salts were prepared by the previously discussed scheme, i.e., reactions 1–3. The resulting mixture of the two salts were charged to heavy walled polymer tube. In addition 0.04 grams of benzoic acid were charged to the tube. Its function was to control the polymer's molecular weight as represented by the resulting viscosity; its use is optional. In addition 0.04 grams of $H_3PO_3$ were charged to the tube. Its function is to serve as a catalyst, again its use is optional. After purging the tube with a nitrogen-vacuum cycle the tube was evacuated and sealed. The tube was placed in an aluminum heating block and the tube's temperature raised to 190° C. It was maintained at that level for 2 hours. The tube was then opened and while an atmosphere of nitrogen was maintained its temperature was raised to 245° C. and maintained at that level for half an hour. Then while the sample was still at 245° C. the nitrogen was removed and while in a vacuum the temperature was maintained for another hour. A sealed tube was used initially to prevent any monomer from distilling off. The lower temperature was used to slowly build up the molecular weight until a higher temperature could be used. After the final heating at 245° C. the material was cooled, chopped and dried for the subsequent melt blending step.

A second random N-30203-6/T, containing by weight 60% of N-30203-6 and 40% of N-30203-T, was prepared in an analogous manner except that the amounts of the salts used were different. A third random N-30203-6-T was prepared containing 20% of N-30203-6 and 80% of N-30203-T.

The first prepared N-30203-6/T copolymer was melt blended in the following manner. Seventy three grams of the polymer (80% of 6 and 20% of T) was mixed with 170.3 grams of N-6 and then dried by heating to 80° C. The resulting dried mixture was charged to a suitable glass tube containing a stainless steel helical stirrer. The tube was purged of air with nitrogen and heated to 282° C. using a vapor bath of dimethyl phthalate and stirred for 30 minutes. Upon cooling the resulting N-30203-6/T/6 was removed from the tubes, chopped and dried. In this copolymer the —(CH$_2$)$_4$- bivalent radical amounts to 97% of the x defined in Claim 1.

The second prepared N-30203-6/T copolymer was melt blended as previously described except that 75 grams of the N-30203-6/T copolymer (60% of 6 and 40% of T) and 175 grams of N-6 were used. In the resulting copolymer of N-30203-6/T//6 the —(CH$_2$)$_4$- bivalent radical amounts to 93.5% of the "x" defined in Claim 1.

The third prepared N-30203-6/T was melt blended as previously described except that 60 grams of N-30203-6/T (20% of 6 and 80% of T) were used. In the resulting copolymer of N-30203-6/T//6 the —(CH$_2$)$_4$-bivalent radical amounts to 87.5 % of the "x" defined in claim 1.

A comparative N-30203-6//6 sample was also prepared by heating and mixing at 282° C. for 26 minutes.

Samples of three N-30203-6/T/6 copolymers along with the N-30203-6//6 were individually spun into a fiber using a ram-extruder. The samples were spun through a spinneret having 7 orifices 12 mils in diameter and 24 mils in length. The dried samples, about 50 grams, were changed to the extruder and allowed 25 minutes to melt and reach an equilibrium temperature i.e., about 230° C. Then the samples were forced through screen filters, 40 mesh and 250 mesh stainless steel screens and the spinneret by a motor-driven ram. The samples of N-30203-6//6 were melt spun at a suitable feed rate. The samples of N-30203-6/T//6 were spun at a feed rate of about 1.6 cm$^3$min. The yarns were passed from the spinneret through gides and were collected on paper tubes at a take-up speed of 138 ft./min. A spin finish, which is commercially available and which had been dissolved in heptane, was applied to each yarn as it passed over an applicator. The applicator was a nylon felt saturated with the spin finish and was attached to the yarn guide located about 4 feet below the spinneret. During each of the spinning steps the block temperature of the extruder was about 225° C. while the ram pressure for the sample containing 3% T was 400 psig whereas it was 535 psig for the sample containing 6.5% T. The pressure for the 12.5% T sample was 670 psig and the temperature was 232° C.

After the fiber spun was drawn and then annealed to stabilize the drawings, the resulting stabilized fiber was knitted into a tube, and placed in boiling water. After cooling the tube was deknitted. During the deknitting step no fiber fusion was found for any of the three N-30203-6/T//6 samples.

Samples of the three N-30203-6/T//6 copolymers were tested as to water retention (L. A. Welco, H. M. Zufle and A. W. McDonald, Textile Research Journal, 22, 261 (1952)). The amount of water retention versus the amount of T in the copolymer is as follows:

| % T | % Water Retention |
|---|---|
| 0 | 28 |
| 3.5 | 26 |
| 6.5 | 23 |
| 12.5 | 19 |

In contrast during the deknitting step for the tube made of N-30203-6//6 polymer a small number of fibers were found fused together. While the amount of fusion was labeled small, the amount was sufficient to make it unacceptable as a commercial fabric.

The invention claimed is:

1. A block copolymer having a molecular weight of about 5000–100,000 and the following repeating structural formula:

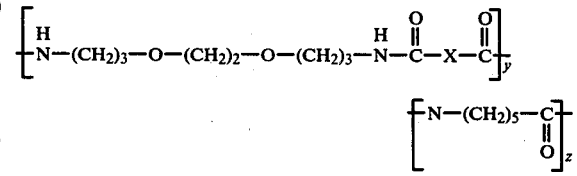

wherein X consists essentially of the bivalent radical —(CH$_2$)$_4$— and the bivalent paraphenylene radical, the latter being present in minor amount sufficient to eliminate fiber fusion when the copolymer is scoured in boiling water, but not greater than about 13 weight percent of the total bivalent radical X and y=4–200 z=4–200.

2. A method for producing a copolymer of poly (4,7-dioxadecamethyleneadipamide)-polycaprolactam containing terephthalic acid comprising:

a. mixing salts of both

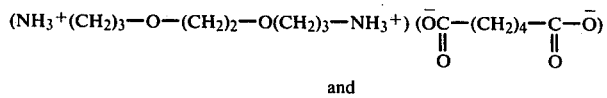

and

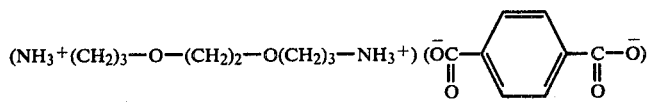

b. heating the salts to form a random copolymer; and
c. melt blending the random copolymer and polycaprolactam to form a copolymer having a molecular weight of about 5000–100,000 and the following structural formula:

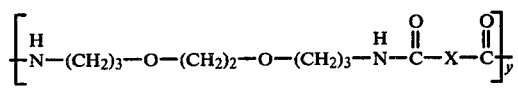

-continued

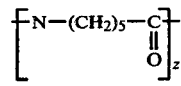

wherein x consists essentially of the bivalent radical —$(CH_2)_4$— and the bivalent paraphenylene radical, the latter being present in minor amount sufficient to eliminate fiber fusion when the copolymer is scoured in boiling water, but not greater than about 13 weight percent of the total bivalent radical X and y=4–200
z=4–200.

* * * * *